Jan. 10, 1939.   H. W. PLEISTER   2,143,086
BOLT ANCHOR
Filed March 2, 1938   2 Sheets-Sheet 1

INVENTOR
HENRY W. PLEISTER.
BY
ATTORNEY

Jan. 10, 1939.  H. W. PLEISTER  2,143,086
BOLT ANCHOR
Filed March 2, 1938  2 Sheets-Sheet 2

INVENTOR
HENRY W. PLEISTER.
BY
ATTORNEY

Patented Jan. 10, 1939

2,143,086

UNITED STATES PATENT OFFICE 2,143,086

BOLT ANCHOR

Henry W. Pleister, Westfield, N. J., assignor to Diamond Expansion Bolt Co. Inc., Garwood, N. J., a corporation of New Jersey Application March 2, 1938, Serial No. 193,420

6 Claims. (Cl. 72—105)

My invention covers a simplified and economical bolt anchor. Such bolt anchors, covered by this application, are expanded in a hole by caulking or ramming them into expanded position by a caulking or other tool, as is well known in the trade.

My invention further covers such a bolt anchor having few parts, all of which are cast separately before assembling them. As there are no rights or lefts, they can be quickly assembled and secured together by unskilled labor to permit shipping, handling and transportation to the job.

Other advantages of my invention will be described in detail in this specification.

My invention further relates to certain combinations, sub-combinations, articles of manufacture, and details of construction, all of which will be more fully hereinafter described and pointed out in the claims.

Figure 1:
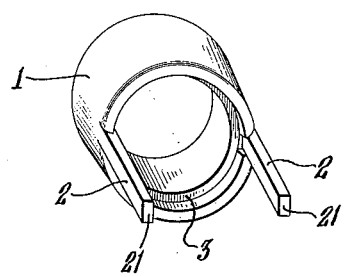
Fig. 1 is a perspective view of the lead alloy, or other ductile metal ring with its ductile securing arms and its recessed seat, to receive the end of the malleable iron or other hard metal cone member.
Figure 2:
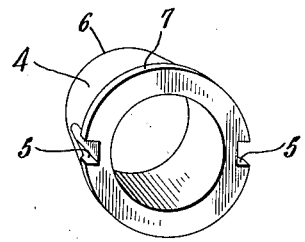
Fig. 2 is a perspective view of the malleable iron cone member provided with exterior grooves or channels to receive the ductile securing arms of the lead alloy ring.
Figure 3:
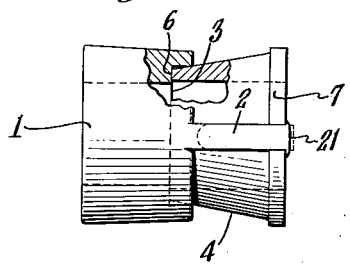
Fig. 3 is a side elevation, partly broken away, showing the end of the cone member resting on its seat in the ductile ring.
Figure 4:
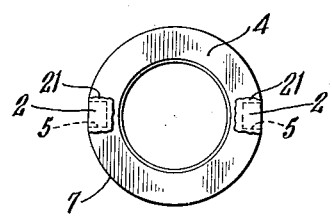
Fig. 4 is an end view showing the ends of the ductile securing arms headed or upset, in any suitable manner over the exterior surface of the cone member to secure the two members together. This is known as the single type.
Figure 5:
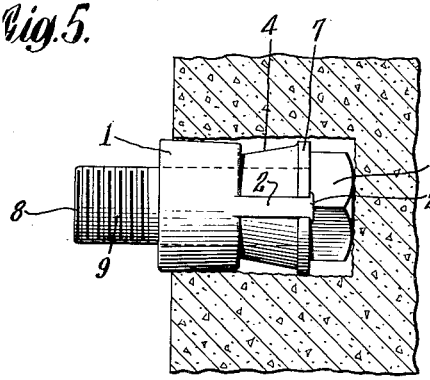
Fig. 5 is a vertical section through a wall or other support, showing my bolt anchor about to be expanded by a caulking tool, not shown.
Figure 6:
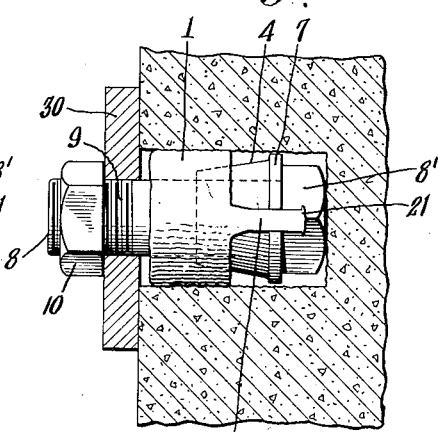
Fig. 6 is a view, similar to Figure 5, showing the bolt anchor expanded and adapted through the bolt to support any suitable work.

To satisfactorily market articles such as covered by this application, and to encourage their use, it is absolutely necessary that their cost be reduced to the minimum. This requires that the bolt anchors be as simple and have as few parts as possible, and that no relatively expensive steps of manufacture be employed, or, that expensive molds be used.

In the simplest form of my invention I cast separately and prior to assembly a hollow ductile ring 1, of lead, or one of its alloys or similar ductile metal, providing it with two ductile securing arms 2, 2, which are preferably cast integral with the ring 1. I also provide the interior of the ring 1 with a seat 3, for a purpose to be hereinafter described.

The co-operating hollow cone member 4 is cast separately, and prior to assembly, of some harder metal, such as malleable iron.

This cone member 4 is cast with exterior longitudinally extending grooves or channels 5, 5 to receive and co-operate with the ductile securing arms 2, 2. These arms 2, 2 are slightly longer than the over all length of the completed bolt anchor.

These parts cast separately can be quickly and cheaply assembled by unskilled labor by simply placing the ductile ring 1 flat on a table or work bench with the ductile securing arms 2, 2 extending vertically. The malleable iron cone 4 is then brought into position with its exterior grooves or channels 5, 5 registering with the securing arms 2, 2. It can then be dropped into the ductile ring 1 until its surface 6 is stopped by and rests on the seat 3. This seat 3 regulates and predetermines the initial position of the cone member and also serves with the ductile arms 2, 2 to secure the ductile ring and cone member together. However, it does not limit the inward movement of the iron cone during caulking or expansion of the bolt anchor. When in this position the ends 21, 21 of the ductile securing arms 2, 2 extend slightly beyond the head 7 of the cone member 4. The operator then with two or more blows of a hammer, or a single stroke of a foot or power punch press or similar tool, upsets or bends over the ends 21, 21 of the ductile arms 2, 2 on the outside of the head 7 thereby firmly securing the ductile ring 1 and the cone member 4 together for handling, shipping and transportation.

In my invention the ductile ring 1 with its securing arms 2, 2 is cast prior to assembly in an inexpensive mold. The malleable iron cone member 4 with its exterior grooves or channels 5, 5, is cast in a sand mold drawing the pattern out vertically along its longitudinal axis without the use of expensive cores. There are no thin projections on the malleable iron cone member 4 which are difficult to cast in iron or hard non-ferriferous metal and add to the cost of manufacture.

It will be further noted that in my invention there is no need of strengthening the lead or ductile ring 1 with more rigid metal. The bond or grip in my invention is entirely formed by the malleable iron or similar metal cone member 4 expanding the metal of the ductile ring 1 into all voids, irregularities and crevices in the walls of the hole in which it is expanded by a caulking, or other tool not shown.

In using my invention ordinarily the head 8' of the bolt 8 is inserted at the bottom of the hole, leaving the screw threaded shank 9 extending out from the face of the wall or other surface to hold the work 30 in co-operation with a nut 10.

In some cases it is desirable to have the head 8' of the bolt 8 on the exterior of the wall or other support.

Figure 7:
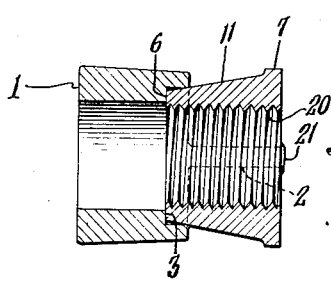
Fig. 7 is a longitudinal vertical section of the single type, illustrating a modification, in which the malleable iron cone member is provided with female screw threads to co-operate with the male threads of a bolt.

In Figure 7 I have illustrated a malleable iron cone 11 provided with female screw threads 20 to co-operate with the male threads of the bolt 8. In this form it is good practice to screw into the cone 11 a dummy bolt (not shown) and leave it there while the bolt anchor is being expanded by any suitable caulking tool, not shown. After expansion the dummy bolt (not shown) is screwed out of the cone 11 so that the regular bolt 8 may be inserted.

Figure 9:
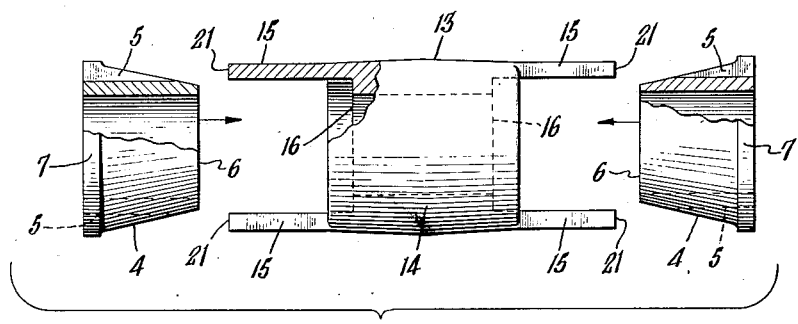
Fig. 9 is a plan view, partly broken away, illustrating a double type bolt anchor having a single ductile ring and two sets of ductile arms to cooperate with two separate malleable iron or other hard metal cones.

In some cases I may employ a double type bolt anchor 13 as illustrated in Figure 9.

In this form I employ a larger ring 14 of ductile metal having two sets of ductile securing arms 15, 15, and provided with two seats 16, 16, one in each end of the ductile ring 14. These arms are preferably cast as shown.

The malleable iron, or other hard metal cone members 4, 4 are the same as in the single type and have the same grooves or channels 5, 5 to receive the ductile securing arm 15, 15. In this form the three parts of the bolt anchor are secured together in the same manner as previously described for the single type, except of course, the ends of each set of securing arm 15, 15 will have to be headed or upset which will secure all three members together.

Figure 10:
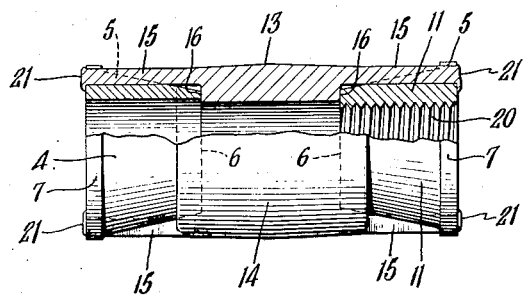
Fig. 10 is a view similar to Figure 9 showing a double type; one of the cone members is provided with female screw thread to co-operate with the male threads of a bolt.

In Figure 10 I have shown one of the malleable iron or similar metal cone members provided with female screw threads 20 to permit the head of the bolt to be exposed on the outside of a wall or other support, as described in detail in connection with the single type bolt anchor.

Figure 8:
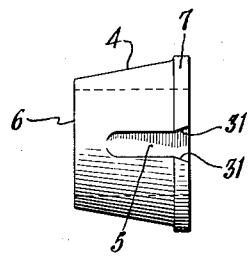
Fig. 8 is a plan view of a modification in which a portion of the slots on the cone member may be undercut.

In some cases I may provide a portion of the grooves or channels 5, 5 in the cone member with undercut surfaces 31, 31 to co-operate with the ductile securing arms 2, 2, see Figure 8.

In caulking the securing arms 2, 2 being on the exterior of the cone member and in contact with the surface of the hole add to the effective gripping surface of the lead or other ductile metal ring and increase the bond or grip of the bolt anchor.

It is to be understood that two of my single type bolt anchors may be used in the same hole in co-operation with a single bolt; or, a double type and a single bolt anchor may be used in the same hole with a single bolt if desired.

Having thus described this invention in connection with illustrative embodiments thereof, to the details of which I do not desire to be limited, what is claimed as new and what is desired to secure by Letters Patent is set forth in the appended claims.

What I claim is—

1. In a bolt anchor expanded by caulking the combination of a ductile ring cast separately prior to assembly provided with longitudinally extending ductile securing arms, a relatively hard metal cone member cast separately prior to assembly provided with exterior grooves or channels to receive and co-operate with the ductile securing arms, the ends of said arms being adapted to be headed or upset over the outer surface of the cone member to secure the cone member and ductile ring together for handling and transportation.

2. In a bolt anchor expanded by caulking the combination of a ductile ring cast separately prior to assembly provided with longitudinally extending ductile securing arms and a seat to initially limit the inward movement of a cone member but not to limit its movement when the bolt anchor is caulked, a relatively hard metal cone member cast separately prior to assembly provided with exterior grooves or channels to receive and co-operate with ductile securing arms, the end of said arms being adapted to be headed or upset over the outer surface of the cone member to secure the cone member and ductile ring together for handling and transportation.

3. In a bolt anchor expanded by caulking the combination of a ductile ring cast separately prior to assembly having integral ductile securing arms extending longitudinally from the periphery of the ductile ring and adapted to contact with the inner surface of the hole into which the anchor is inserted to increase the bond or grip of the bolt anchor, a cone member of relatively hard metal cast separately prior to assembly said ductile arms being provided with means to secure the cone member and ductile ring together for handling and transportation.

4. In a bolt anchor expanded by caulking the combination of a ductile ring cast separately and prior to assembly having integral ductile securing arms extending longitudinally from the periphery of the ductile ring and adapted to contact with the inner surface of the hole into which the anchor is inserted to increase the bond or grip of the bolt anchor, and also provided with a seat for a cone member, a cone member of relatively hard metal cast separately prior to assembly provided with grooves or channels to receive the ductile securing arms of the ductile ring the ends of the arms being adapted to be headed or upset on the exterior surface of the cone to hold the two members together for handling and transportation.

5. In a bolt anchor expanded by caulking of the double type having a single ring of ductile metal cast separately and prior to assembly provided with two sets of ductile securing arms extending longitudinally from either end, two hard metal cones, cast separately and prior to assembly provided with exterior grooves or channels to receive the different ductile securing arms, the ends of said arms being headed or upset on the exterior surface of each of the hard metal cones to hold the two cones and the ductile metal rings together for handling and transportation.

6. In a bolt anchor expanded by caulking of the double type having a single ring of ductile metal cast separately and prior to assembly provided with two sets of ductile securing arms extending longitudinally from either end, and also provided with two seats, one at each end to cooperate with the cone members, two hard metal cones cast separately and prior to assembly provided with exterior grooves or channels to receive the different ductile securing arms, the ends of said arms being headed or upset over the exterior surface of each of the hard metal cones to hold the two cones and the ductile metal rings together for handling and transportation.

HENRY W. PLEISTER.